US012514292B2

(12) United States Patent
Xie

(10) Patent No.: US 12,514,292 B2
(45) Date of Patent: Jan. 6, 2026

(54) ELECTRONIC VAPORIZATION DEVICE AND VAPORIZER AND HEATING COMPONENT THEREOF

(71) Applicant: Shenzhen Verdewell Technology Limited, Guangdong (CN)

(72) Inventor: Ju Xie, Shenzhen (CN)

(73) Assignee: Shenzhen Verdewell Technology Limited, Shenzhen (CN)

( * ) Notice: Subject to any disclaimer, the term of this patent is extended or adjusted under 35 U.S.C. 154(b) by 402 days.

(21) Appl. No.: 18/080,507

(22) Filed: Dec. 13, 2022

(65) Prior Publication Data

US 2023/0180838 A1 Jun. 15, 2023

(30) Foreign Application Priority Data

Dec. 15, 2021 (CN) ......................... 202123159315.5

(51) Int. Cl.
*A24F 40/46* (2020.01)
*A24F 40/50* (2020.01)
*H05B 3/22* (2006.01)

(52) U.S. Cl.
CPC .............. *A24F 40/46* (2020.01); *A24F 40/50* (2020.01); *H05B 3/22* (2013.01)

(58) Field of Classification Search
None
See application file for complete search history.

(56) References Cited

U.S. PATENT DOCUMENTS 1,118,276 A * 11/1914 Fredericks ................ A24F 5/08 131/183
11,147,128 B2 10/2021 Qiu
2013/0269716 A1 10/2013 Hoang et al.
2015/0013696 A1* 1/2015 Plojoux ................. A61M 15/06 131/328

(Continued)

FOREIGN PATENT DOCUMENTS

CN 106617324 A * 5/2017 ........... A24F 47/008
CN 208850681 U 5/2019

OTHER PUBLICATIONS

US 10,448,674 B1, 10/2019, Volodarsky et al. (withdrawn)

(Continued)

*Primary Examiner* — Philip Y Louie
*Assistant Examiner* — Morgan Faith Dezendorf
(74) *Attorney, Agent, or Firm* — Leydig, Voit & Mayer, Ltd.

(57) ABSTRACT

A heating component includes: a heating pot; a self-locking component; and a limiting component. The self-locking component is accommodated in the limiting component and has a locked state of being engaged with the limiting component and an unlocked state of being disengaged from the limiting component. The heating pot is movably accommodated in the limiting component and is movable between a first position and a second position. The heating pot is pressable against the self-locking component. The self-locking component is switchable from the locked state to the unlocked state when the heating pot is pressed at the first position. The self-locking component pushes the heating pot to move to the second position when the self-locking component is switched from the locked state to the unlocked state.

18 Claims, 11 Drawing Sheets

(56) References Cited

U.S. PATENT DOCUMENTS

| | | | | |
|---|---|---|---|---|
| 2015/0366267 | A1* | 12/2015 | Liu | A24F 40/44<br>131/329 |
| 2017/0303587 | A1 | 10/2017 | Johnson et al. | |
| 2018/0055091 | A1* | 3/2018 | Trzecieski | A61M 15/009 |
| 2020/0008475 | A1 | 1/2020 | Lai et al. | |
| 2020/0390986 | A1 | 12/2020 | Rosen | |
| 2022/0022541 | A1 | 1/2022 | Pijnenburg | |
| 2023/0180837 | A1 | 6/2023 | Chen | |

OTHER PUBLICATIONS

CN 106617324 A1 English translation obtained from Clarivate Analytics, pp. 1 to 10 (Year: 2025).*
Learn Something New, "Push-type elastic self-locking mechanism, the principle is really ingenious," http://www.360doc9.net/wxarticlenew/961261849.html, Feb. 8, 2021.
Canadian Intellectual Property Office, First Office Action in Canadian Patent Application No. 3,184,957 (Apr. 24, 2024).
Canadian Intellectual Property Office, First Office Action in Canadian Patent Application No. 3,185,160 (Apr. 26, 2024).
U.S. Patent and Trademark Office, Office Action in U.S. Appl. No. 18/080,478 (Mar. 6, 2025).

* cited by examiner

ELECTRONIC VAPORIZATION DEVICE AND VAPORIZER AND HEATING COMPONENT THEREOF

CROSS-REFERENCE TO PRIOR APPLICATION

Priority is claimed to Chinese Patent Application No. 202123159315.5, filed on Dec. 15, 2021, the entire disclosure of which is hereby incorporated by reference herein.

FIELD

The present invention relates to the field of vaporization, and in particular, to an electronic vaporization device and a vaporizer and a heating component thereof.

BACKGROUND

During operation of an electronic vaporization device using a heating pot for baking, an aerosol-forming substrate (for example, plant leaves, a tobacco paste, or a tobacco shred) filling the heating pot is heated to generate smoke for inhalation by a user. However, heating pots of current electronic vaporization devices on the market cannot be disassembled or cannot be easily disassembled or assembled.

SUMMARY

In an embodiment, the present invention provides a heating component, comprising: a heating pot; a self-locking component; and a limiting component, wherein the self-locking component is accommodated in the limiting component and has a locked state of being engaged with the limiting component and an unlocked state of being disengaged from the limiting component, wherein the heating pot is movably accommodated in the limiting component and is movable between a first position and a second position, wherein the heating pot is pressable against the self-locking component, wherein the self-locking component is switchable from the locked state to the unlocked state when the heating pot is pressed at the first position, and wherein the self-locking component is configured to push the heating pot to move to the second position when the self-locking component is switched from the locked state to the unlocked state.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
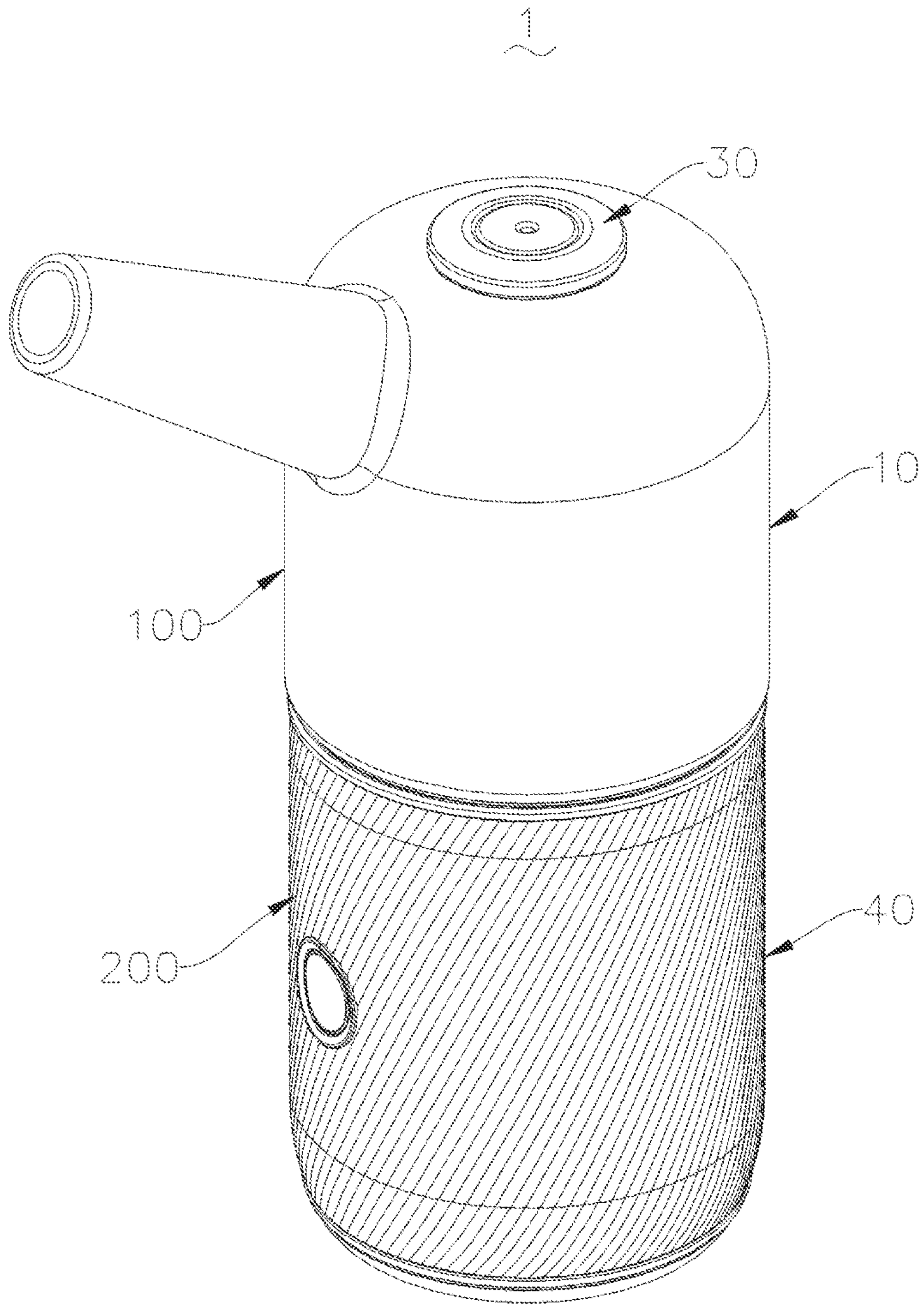
FIG. 1 is a schematic three-dimensional structure diagram of an electronic vaporization device according to some embodiments of the present invention.

In an embodiment, the present invention provides an improved heating component and a vaporizer and an electronic vaporization device having the heating component.

In an embodiment, the present invention provides a heating component, including a heating pot, a self-locking component, and a limiting component. The self-locking component is accommodated in the limiting component, and has a locked state of being engaged with the limiting component and an unlocked state of being disengaged from the limiting component. The heating pot is movably accommodated in the limiting component, and is movable between a first position and a second position. The heating pot is configured to be pressed against the self-locking component, and the self-locking component is switched from the locked state to the unlocked state when the heating pot is pressed at the first position. The self-locking component pushes the heating pot to move to the second position when the self-locking component is switched from the locked state to the unlocked state.

In some embodiments, when the heating pot is pressed at the second position, the self-locking component is pushed to move and the self-locking component is switched from the unlocked state to the locked state.

In some embodiments, the limiting component includes an engagement groove, the self-locking component includes a hook portion, and the hook portion is engaged with or disengaged from the engagement groove to lock or unlock the self-locking component.

In some embodiments, the limiting component includes a first limiting tube, and the engagement groove is formed on a side wall of the first limiting tube.

The self-locking component includes a support element slidably accommodated in the first limiting tube and a drag hook swingably arranged on the support element, and the hook portion is formed on the drag hook.

In some embodiments, a first limiting protrusion and a second limiting protrusion that protrude inward are formed on an inner wall surface of the first limiting tube, and the engagement groove is formed between the first limiting protrusion and the second limiting protrusion.

In some embodiments, a sliding groove is further arranged on the side wall of the first limiting tube, a slidable block that protrudes outward is formed on a side wall of the support element, and the slidable block is slidably arranged in the sliding groove.

In some embodiments, the self-locking component further includes a first elastic piece, where two ends of the first elastic piece are respectively connected to the drag hook and the first limiting tube.

In some embodiments, the self-locking component further includes a second elastic piece, where two ends of the second elastic piece are respectively connected to the support element and the first limiting tube.

In some embodiments, the first elastic piece and the second elastic piece are distributed symmetrically with respect to a central axis of the support element.

In some embodiments, the self-locking component further includes an elastic engagement piece arranged on the support element, and the elastic engagement piece is configured to lock the heating pot at the first position and release the heating pot at the second position.

In some embodiments, the elastic engagement piece includes two elastic arms. At the first position, the two elastic arms are deformed inward under constraint of the first limiting tube, so as to lock the heating pot. At the second position, the two elastic arms are released from the constraint and open outward, so as to release the heating pot.

In some embodiments, the heating component further includes a first electrode portion and a second electrode portion arranged on a bottom surface of the heating pot. The second electrode portion is arranged at a middle portion of the bottom surface of the heating pot, and the first electrode portion is annular and surrounds the second electrode portion.

In some embodiments, the heating component further includes a first elastic electrode and a second elastic electrode accommodated in the limiting component, where the first elastic electrode and the second elastic electrode are respectively configured to contact and be connected to the first electrode portion and the second electrode portion.

In some embodiments, the first elastic electrode is a metal elastic sheet and includes an elastic contact configured to elastically contact and be connected to the first electrode portion.

In some embodiments, the heating component further includes a temperature detection element. The elastic contact is cylindrical, and the temperature detection element is embedded in the elastic contact.

In some embodiments, the heating component further includes a base accommodated in the limiting component, where the first elastic electrode and the second elastic electrode are both mounted to the base.

In some embodiments, the heating component further includes a connector movably accommodated in the limiting component and arranged between the heating pot and the support element.

In some embodiments, the heating component further includes an outer tube configured to accommodate the limiting component.

The present invention further provides a vaporizer, including the heating component described in any of the above. An end of the vaporizer has a first opening, and at least part of the heating pot protrudes out of the first opening when the heating pot is at the second position.

The present invention further provides an electronic vaporization device, including the vaporizer described in any of the above.

Implementing the present invention brings at least the following beneficial effects: The self-locking component can be switched from the locked state to the unlocked state when the heating pot is pressed at the first position. At this time, the self-locking component can push the heating pot to move to the second position, so that at least part of the heating pot extends out of the vaporizer. In this way, the heating pot can be taken out conveniently and quickly.

To provide a clearer understanding of the technical features, objectives, and effects of the present invention, specific implementations of the present invention are described with reference to the accompanying drawings. In the following description, many specific details are provided to facilitate a full understanding of the present invention. However, the present invention may alternatively be implemented in other manners different from those described herein, and a person skilled in the art may make similar modifications without departing from the content of the present invention. Therefore, the present invention is not limited to the embodiments disclosed below.

In the description of the present invention, it should be understood that directions or location relationships indicated by terms "center", "longitudinal", "transversely", "length", "width", "thickness", "upper", "lower", "front", "rear", "left", "right", "vertical", "horizontal", "top", "bottom" "inner", "outer", "clockwise", "counterclockwise" "axial direction", "radial direction" and "circumferential direction" are based on the directions or location relationships shown in the accompanying drawings or the directions or location relationships that are usually placed when the product of the present invention is used, and are merely used for the convenience of describing the present invention and simplifying the description, but are not used to indicate or imply that a device or an element needs to have a particular direction or be constructed and operated in a particular direction, and therefore, cannot be understood as a limitation to the present invention.

In addition, terms "first" and "second" are used merely for the purpose of description, and shall not be construed as indicating or implying relative importance or implying a quantity of indicated technical features. Therefore, features defining "first" and "second" can explicitly or implicitly include at least one of the features. In description of the present invention, "multiple" means at least two, such as two and three unless it is specifically defined otherwise.

In the present invention, unless otherwise explicitly specified or defined, the terms such as "mount", "connect", "connection", and "fix" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two elements or mutual action relationship between two elements, unless otherwise specified explicitly. A person of ordinary skill in the art can understand specific meanings of the terms in the present invention according to specific situations.

In the present invention, unless explicitly specified or limited otherwise, a first characteristic "on" or "under" a second characteristic may be the first characteristic in direct contact with the second characteristic, or the first characteristic in indirect contact with the second characteristic by using an intermediate medium. In addition, that the first feature is "above", "over", or "on" the second feature may indicate that the first feature is directly above or obliquely above the second feature, or may merely indicate that the horizontal position of the first feature is higher than that of the second feature. That the first feature is "below", "under", and "beneath" the second feature may be that the first feature is right below the second feature or at an inclined bottom of the second feature, or may merely indicate that the horizontal position of the first feature is lower than that of the second feature.

It should be noted that, when a component is referred to as "being fixed to" or "being arranged on" another component, the component may be directly on the another component, or there may be an intermediate component. When one component is considered as "being connected to" another component, the component may be directly connected to the another component, or an intermediate component may simultaneously exist. The terms "vertical", "horizontal", "upper", "lower", "left", "right", and similar expressions used in this specification are merely used for an illustrative purpose, and do not represent the only implementation.

Figure 2:
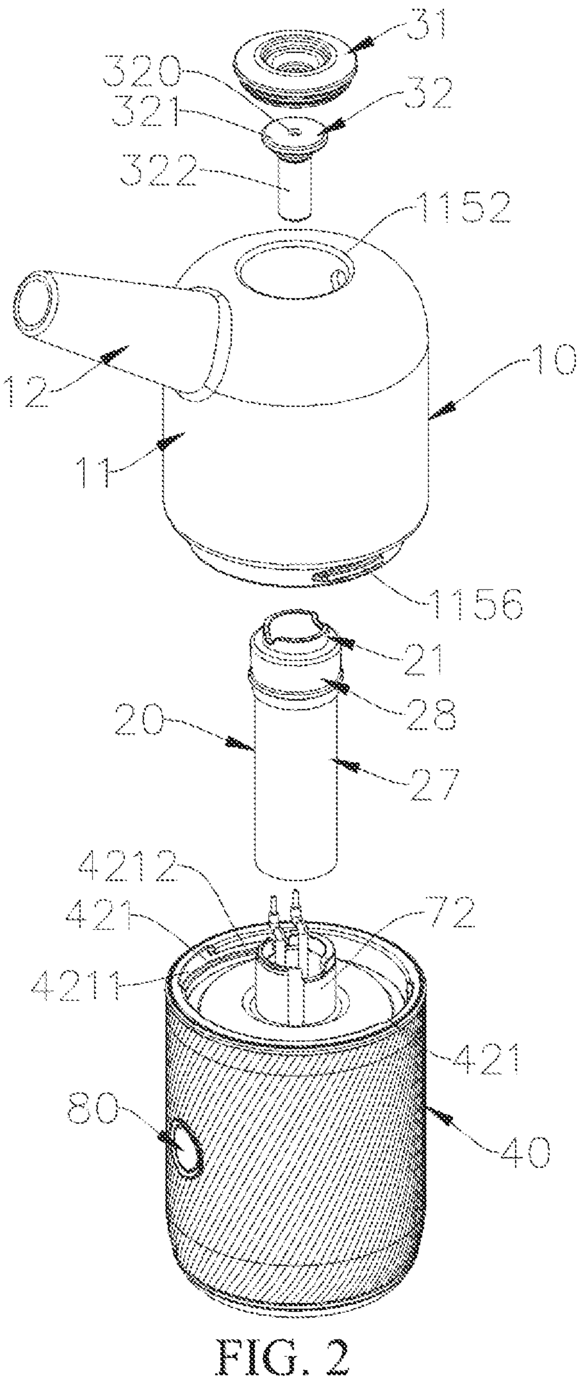
FIG. 2 is a schematic structural exploded view of the electronic vaporization device shown in FIG. 1.
Figure 3:
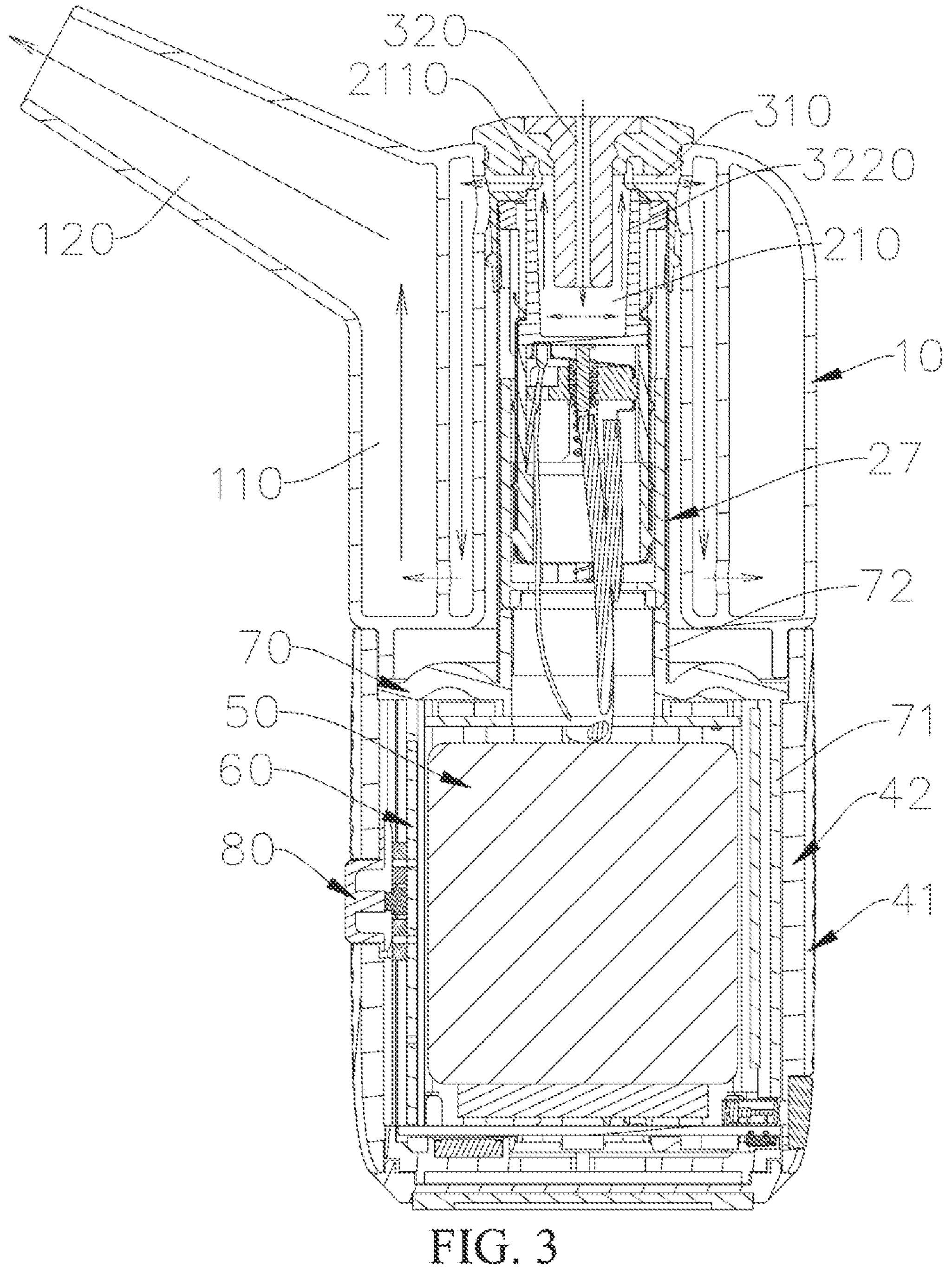
FIG. 3 is a longitudinal cross-sectional view of the electronic vaporization device in FIG. 1.

FIG. 1 to FIG. 3 show an electronic vaporization device 1 according to some embodiments of the present invention. The electronic vaporization device 1 may be substantially in a shape of a round column, and may include a main unit 200 and a vaporizer 100 arranged above the main unit 200 along a longitudinal direction. The main unit 200 is mainly configured to supply power to the vaporizer 100, and may control turn-on and turn-off of the entire electronic vaporization device. The vaporizer 100 is configured to accommodate an aerosol-forming substrate, and to heat and vaporize the aerosol-forming substrate after being electrified, so as to generate an aerosol for inhalation by a user. The aerosol-forming substrate may be in a form of a plant leave, a paste, or a gel. It may be understood that, in other embodiments, the shape of the electronic vaporization device 1 is not limited to the shape of a round column, but may also be other shapes such as the shape of an elliptical column, the shape of a square column, or the shape of a flat column.

In some embodiments, the main unit 200 may include a shell 40, a battery 50, a circuit board 60, a holder 70, and a button 80. The battery 50, the circuit board 60, and the holder 70 are all accommodated in the shell 40. A related control circuit is arranged on the circuit board 60. The control circuit is electrically connected to the battery 50 and the heating component 20 for controlling the battery 50 to supply power to the heating component 20. The button 80 is arranged on a side wall of the shell 40 and is configured to receive an operation performed by a user, so as to turn on the circuit board 60 to control the battery 50 to supply power to the heating component 20.

The shell 40 may be cylindric, and may include a cylindric first shell 41 located outside and a second cylindric shell 42 located inside. The second shell 42 may be a hard shell, which provides support and protection. The first shell 41 is sleeved outside the second shell 42. The first shell may be made of a soft material such as a soft glue, which can improve a touch feeling for a user.

In some embodiments, the holder 70 may include a holder body 71 accommodated in the shell 40 and a sleeve portion 72 extending upward from a top wall of the holder body 71. The holder body 71 may be in a shape of a cylinder having an opening on a side. The battery 50 may be accommodated in the holder body 71, and the circuit board 60 may be arranged on the side of the holder body 71 having the opening and arranged corresponding to the button 80. The sleeve portion 72 may be cylindric, and may be formed by integrally extending upward on the top wall of the holder body 71. The sleeve portion 72 may extend out of the shell 40 and is configured to be sleeved on and connected to the heating component 20.

The vaporizer 100 may include a nozzle integrated condensation cap 10 with an accommodating cavity 1130 formed therein and the heating component 20 accommodated in the accommodating cavity 1130. The nozzle integrated condensation cap 10 is arranged above the main unit 200 along the longitudinal direction and may be detachably connected to the main unit 200 by screwing, magnetic connection, engagement, or the like. The heating component 20 includes a heating pot 21, and a vaporization cavity 210 configured to accommodate and heat the aerosol-forming substrate is formed in the heating pot 21. A cooling channel 110 and an inhalation channel 120 in communication with the vaporization cavity 210 in sequence are formed in the nozzle integrated condensation cap 10. An aerosol generated after the aerosol-forming substrate is heated and vaporized is cooled through the cooling channel 110 and then outputted through the inhalation channel 120 for inhalation by a user.

In some embodiments, the nozzle integrated condensation cap 10 may be made of glass or the like, and may include a cap body 11 and a nozzle 12 connected to the cap body 11. The inhalation channel 120 is formed in the nozzle 12, and the cooling channel 110 is formed in the cap body 11. Condense water may be further provided in the cooling channel 110. An aerosol passes through the condense water to be condensed and to filter out an impurity in the aerosol for inhalation by the user.

Figure 4:
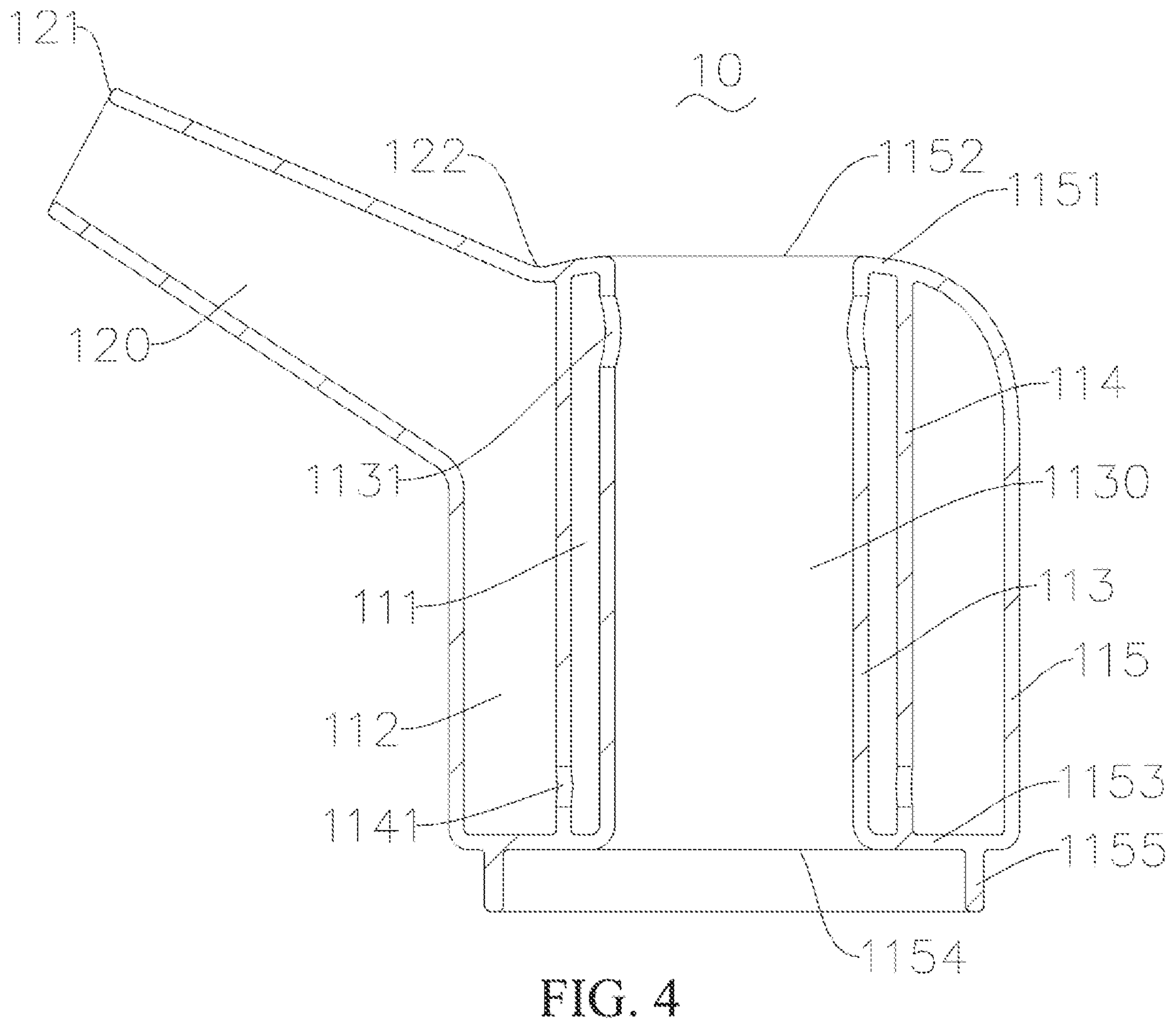
FIG. 4 is a longitudinal cross-sectional view of a nozzle integrated condensation cap in FIG. 2.

As shown in FIG. 3 and FIG. 4, in some embodiments, the cap body 11 may include an outer cap 115 and a first isolating wall 113 and a second isolating wall 114 arranged in the outer cap 115. The outer cap 115 may be substantially cylindric, and an outer diameter thereof may be the same as an outer diameter of the shell 40. A top of the outer cap 115 has an annular top wall 1151. The top wall 1151 may cover an upper end of the cooling channel 110, and an inner wall surface of the top wall 1151 defines a first opening 1152 in communication with the accommodating cavity 1130. A bottom of the outer cap 115 has an annular bottom wall 1153. The bottom wall 1153 may cover a lower end of the cooling channel 110, and an inner wall surface of the bottom wall 1153 defines a second opening 1154 in communication with the accommodating cavity 1130. The cap body 11 may further include an annular connection portion 1155 formed by integrally extending downward on a lower end surface of the bottom wall 1153. At least one spiral engagement protrusion 1156 that protrudes outward may be formed on an outer wall surface of the connection portion 1155, and at least one spiral engagement groove 421 is correspondingly arranged on an inner wall surface of an upper end of the second shell 42. The spiral engagement protrusion 1156 is rotatably engaged in the spiral engagement groove 421 to mount the vaporizer 100 to the main unit 200. Specifically, in this embodiment, two spiral engagement protrusions 1156 are arranged. Each of the spiral engagement protrusions 1156 extends along a circumferential direction of the connection portion 1155, and the two spiral engagement protrusions 1156 are respectively rotationally and symmetrically arranged on two sides of the connection portion 1155 in a circumferential direction. Correspondingly, two spiral engagement grooves 421 are arranged. The two spiral engagement grooves 421 are respectively rotationally and symmetrically arranged on two sides of the second shell 42 in a circumferential direction. Each of the spiral engagement grooves 421 has a guide end 4211 and a locking end 4212 arranged oppositely along a circumferential direction. During assembly, the spiral engagement protrusion 1156 is guided into the spiral engagement groove 421 along the guide end 4211, and is then rotated by a set angle (for example, 10°-30°) to the locking end 4212, so as to lock and fix the nozzle integrated condensation cap 10 to the second shell 42. During disassembly, the nozzle integrated condensation cap 10 is rotated reversely by a set angle, so that the spiral engagement protrusion 1156 is rotated from the locking end 4212 to the guide end 4211. In this way, the nozzle integrated condensation cap 10 can be taken out from the second shell 42. The locking or take-out by rotation uses a simple structure and is convenient to operate.

The first isolating wall 113 may integrally extend downward from the top wall 1151 to the bottom wall 1153. The first isolating wall 113 may be annular and may be arranged coaxially with the outer cap 115. An inner wall surface of the first isolating wall 113 defines an accommodating cavity 1130 configured to accommodate the heating component 20. An inner diameter of the first isolating wall 113 may be substantially equal to pore sizes of the first opening 1152 and the second opening 1154.

The second isolating wall 114 may integrally extend downward from the top wall 1151 to the bottom wall 1153, and the second isolating wall 114 may be in annular and may be arranged coaxially with the outer cap 115. The second isolating wall 114 is located between the outer cap 115 and the first isolating wall 113, and is spaced apart from the outer cap 115 and from the first isolating wall 113. A first cooling channel 111 is defined between an inner wall surface of the second isolating wall 114 and an outer wall surface of the first isolating wall 113, and a second cooling channel 112 is defined between an outer wall surface of the second isolating wall 114 and an inner wall surface of the outer cap 115. That is to say, the accommodating cavity 110, the first cooling channel 111, and the second cooling channel 112 all extend along the longitudinal direction. The first cooling channel 111 is annular and is arranged on a periphery of the accommodating cavity 110, and the second cooling channel 112 is annular and is arranged on a periphery of the first cooling channel 111. Since the first cooling channel 111 and the second cooling channel 112 are annular, a relatively large accommodating space is available for accommodating a condensate.

At least one first air outlet 1131 configured to communicate the accommodating cavity 110 with the first cooling channel 111 is arranged on the first isolating wall 113, and at least one second air outlet 1141 configured to communicate the first cooling channel 111 with the second cooling channel 112 is arranged on the second isolating wall 114. The first air outlet 1131, the first cooling channel 111, the second air outlet 1141, and the second cooling channel 112 are in communication in sequence and form the cooling channel 110. In this embodiment, two first air outlets 1131 are symmetrically arranged on two sides of the first isolating wall 113 in a circumferential direction. Two second air outlets 1141 are symmetrically arranged on two sides of the second isolating wall 114 in a circumferential direction. The two second air outlets 1141 may be respectively arranged corresponding to the two first air outlets 1131. That is to say, a line connecting the two second air outlets 1141 may be parallel to a line connecting the two first air outlets 1131. It may be understood that, in other embodiments, one or more first air outlets 1131 and one or more second air outlet 1141 may be arranged. In other embodiments, an included angle may be formed between the line connecting the two second air outlets 1141 and the line connecting the two first air outlets 1131. For example, the included angle is 90 degrees.

Preferably, flowing directions of a vapor in the first cooling channel 111 and the second cooling channel 112 are opposite. The first air outlet 1131 is arranged on a side wall of the upper end of the first isolating wall 113, and may be located below the top wall 1151 and close to the top wall 1151. The second air outlet 1141 may be arranged on a side wall of the lower end of the second isolating wall 114 and close to the bottom wall 1153. The upper end of the second cooling channel 112 is in communication with the inhalation channel 120, so that the cooling channel 110 is relatively long, thereby realizing more effective condensation and filtering.

In some embodiments, the vaporizer 100 may further include a seal plug 30 detachably arranged at the first opening 1152. A vent hole 320 may be formed on the seal plug 30 along a longitudinal direction. The vent hole 320 is in communication with the vaporization cavity 210 and may be arranged coaxially with the vaporization cavity 210, so as to communicate the vaporization cavity 210 with an outside. In some embodiments, the seal plug 30 may include an annular seal portion 31 and a vent portion 32 extending through the seal portion 31. An outer wall surface of the seal portion 31 is hermetically engaged with a hole wall of the first opening 1152. The seal portion 31 may be made of an elastic material such as silica gel, which has a sealing effect and can be easily inserted and removed. The vent portion 32 extends through the seal portion 31 along a longitudinal direction, and the vent hole 320 is formed on the vent portion 32 along the longitudinal direction. The vent portion 32 may be made of a hard material such as glass, so that air can pass through the vent hole 320 smoothly, thereby preventing blocking of the vent hole 320. The vent portion 32 may include a top portion 321 located above and a rod portion 322 located below. An outer diameter of the top portion 321 is greater than that an outer diameter of the rod portion 322. The top portion 321 is embedded into the seal portion 31, and the rod portion 322 may pass through the seal portion 31 and extend downward into the vaporization cavity 210. An outer diameter of the rod portion 322 is less than an inner diameter of the heating pot 21, so that a first vent gap 3220 for gas circulation is formed between an outer wall surface of the rod portion 322 and an inner wall surface of the heating pot 21. A second vent gap 310 that communicates the first vent gap 3220 with the first air outlet 1131 is further formed between an upper end surface of the heating component 20 and a lower end surface of the seal portion 31. As shown by arrows in FIG. 3, air enters the vaporization cavity 210 through the vent hole 320, and is mixed with an aerosol generated after vaporization in the vaporization cavity 210, and a vapor obtained after the air is mixed with the aerosol enters an upper end of the first cooling channel 111 through the first vent gap 3220, the second vent gap 310, and the first air outlet 1131 in sequence, and flows downward in the first cooling channel 111 to the second air outlet 1141 at the lower end, and then enters the second cooling channel 112 through the second air outlet 1141 and flows upward in the second cooling channel 112, and is finally outputted through the inhalation channel 120.

The nozzle 12 may be tubular. An inner wall surface thereof defines the inhalation channel 120. The nozzle 12 may be arranged on a side of the outer cap 115 corresponding to one of the second air outlets 1141, and may be formed by integrally extending on an outer wall surface of the outer cap 115. The nozzle 12 has an inhalation end 121 away from the outer cap 115 and a connection end 122 connected to the outer cap 115. The nozzle 12 may be arranged obliquely upward, so that the inhalation end 121 is at a higher position than the connection end 122, which facilitates inhalation by the user. An outer diameter and an inner diameter of the nozzle 12 may gradually decrease from the connection end 122 toward the inhalation end 121, so that a pore size of the inhalation channel 120 gradually decreases from the connection end 122 toward the inhalation end 121. In this way, the vapor at the inhalation end 121 is more concentrated, and inhalation experience is more desirable. In addition, the outer diameter of the nozzle 12 at the inhalation end 121 is relatively small, which helps the user hold the nozzle in the mouth.

Referring to FIG. 5 to FIG. 12, the heating component 20 may include a heating pot 21, a heating element 22, a self-locking component 23, and a limiting component 25. The self-locking component 23 is accommodated in the limiting component 25, and has a locked state of being engaged with the limiting component 25 and an unlocked state of being disengaged from the limiting component 25. The heating pot 21 is movably accommodated in the limiting component 25 and may be pressed against the self-locking component 23. The heating pot 21 is movable between a first position and a second position. The self-locking component 23 can be switched from the locked state to the unlocked state when the heating pot 21 is pressed at the first position. The self-locking component 23 can push the heating pot 21 to move to the second position when the self-locking component 23 is switched from the locked state to the unlocked state.

Figure 7:
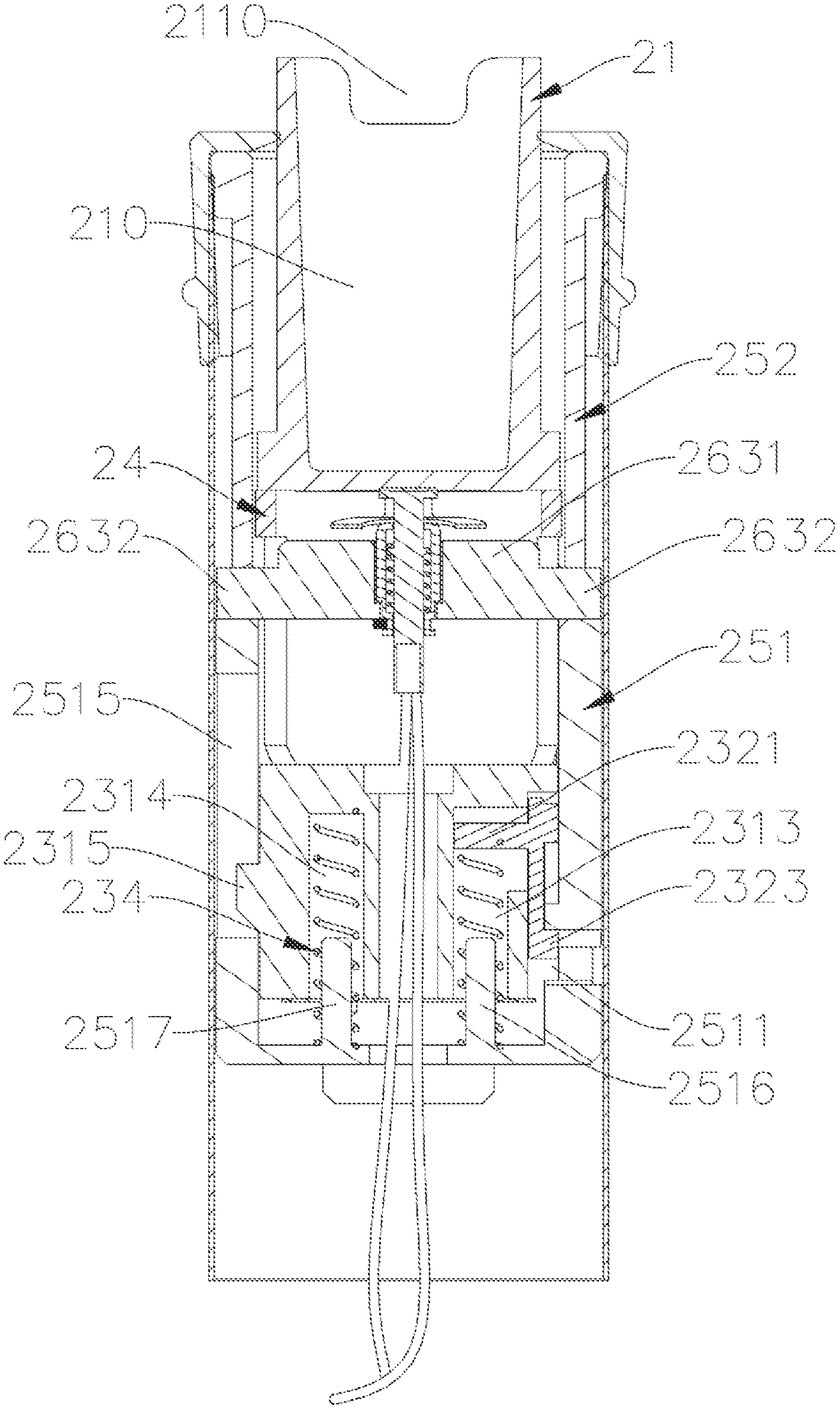
FIG. 7 is a longitudinal cross-sectional view of the heating component in FIG. 2 from another angle.
Figure 8:
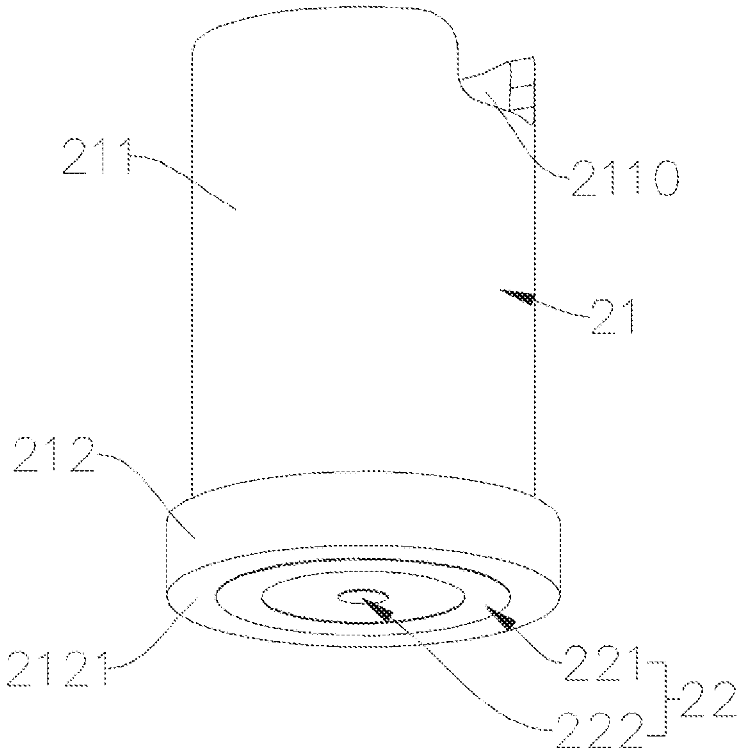
FIG. 8 is a three-dimensional schematic structural diagram of a heating pot of the heating component in FIG. 2.

As shown in FIG. 7 and FIG. 8, the heating pot 21 may be cylindric, an inner wall surface of the heating pot 21 defines the vaporization cavity 210 configured to accommodate the aerosol-forming substrate, and at least one vent opening 2110 configured to communicate the vaporization cavity 210 with the first air outlet 1131 may be further formed on a side wall of the heating pot 21. The heating pot 21 may be made of a ceramic material, for example, an environmentally friendly ceramic material such as alumina, aluminum nitride, or silicon nitride, which is harmless to a human body when heated at a high temperature. The heating pot 21 has a heating surface 2121. The heating element 22 is arranged on the heating surface 2121 and is configured to generate heat after being energized.

Specifically, in this embodiment, the heating pot 21 includes a pot body 211 and a pot bottom 212 located at a bottom of the pot body 211. An outer diameter of the pot body 211 is less than an outer diameter of the pot bottom 212. Two vent openings 2110 are symmetrically arranged on two sides of the pot body 211 in a circumferential direction. Each of the vent openings 2110 may be formed by extending downward on a top surface of a side wall of the pot body 211. The two vent openings 2110 may be respectively arranged corresponding to the two first air outlets 1131. That is to say, a line connecting the two second vent openings 2110 may be parallel to the line connecting the two first air outlets 1131. It may be understood that, in other embodiments, an included angle may be formed between the line connecting the two vent openings 2110 and the line connecting the two first air outlets 1131. For example, the included angle is 90 degrees.

A bottom surface of the pot bottom 212 forms the heating surface 2121 for arranging the heating element 22. The heating element 22 includes a heating body. The heating body may be a heating film and may be formed on the heating surface 2121 by screen printing or the like. It may be understood that, in other embodiments, the heating body is not limited to the heating film. For example, the heating body may alternatively be a metal heating sheet. In this embodiment, the heating element 22 further includes an annular first electrode portion 221 electrically connected to one electrode of the heating body and a second electrode portion 222 electrically connected to the other electrode of the heating body and located inside the first electrode portion 221. The second electrode portion 222 is annular and is located in a middle portion of the bottom surface of the pot bottom 212, the first electrode portion 221 surrounds the second electrode portion 222 and is arranged coaxially with the second electrode portion 222, and an inner diameter of the first electrode portion 221 is greater than an outer diameter of the second electrode portion 222. The arrangement of the electrode portions avoids alignment of the heating pot 21 during assembly, and achieves a foolproof effect.

Figure 5:
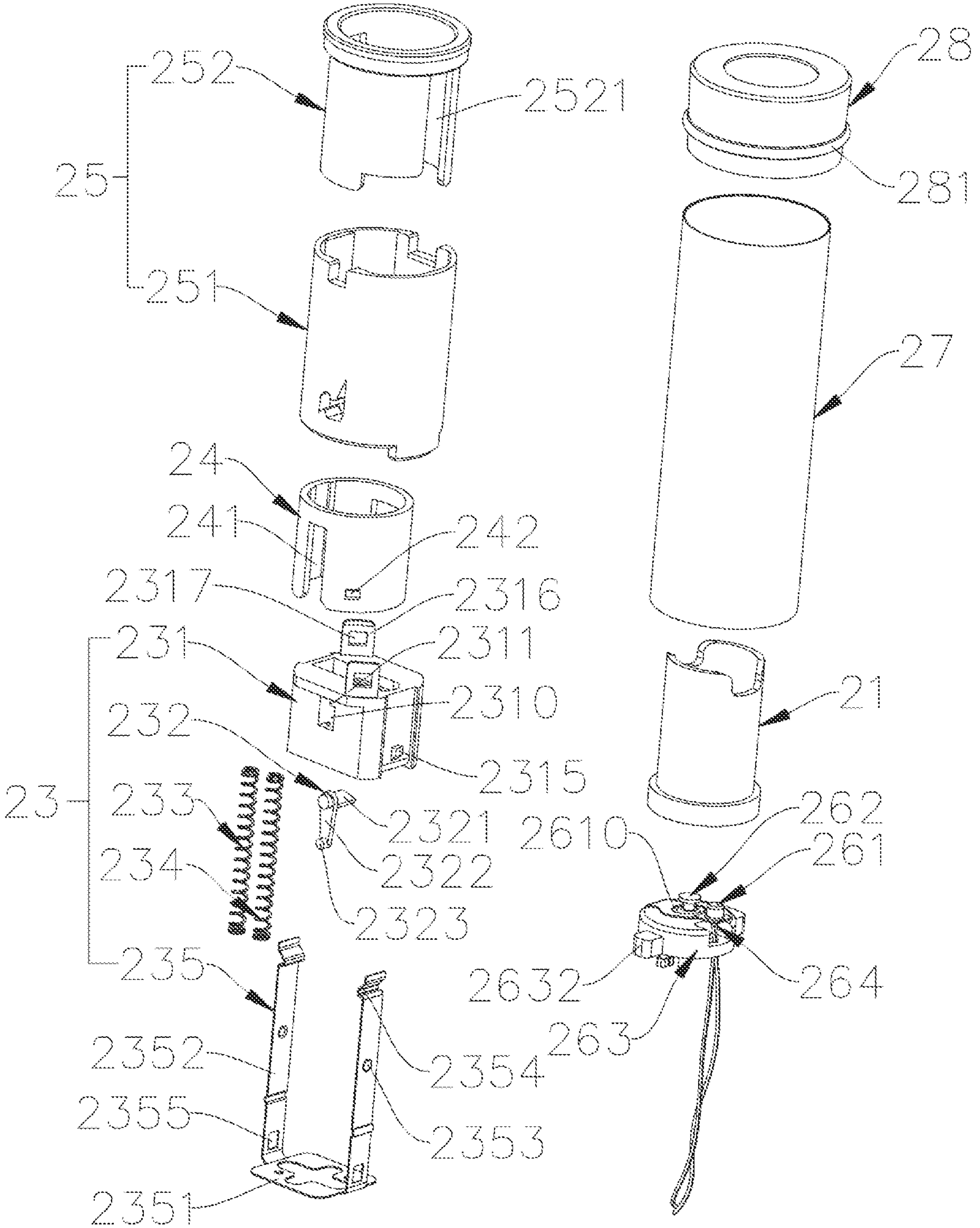
FIG. 5 is a schematic structural exploded view of a heating component in FIG. 2.
Figure 6:
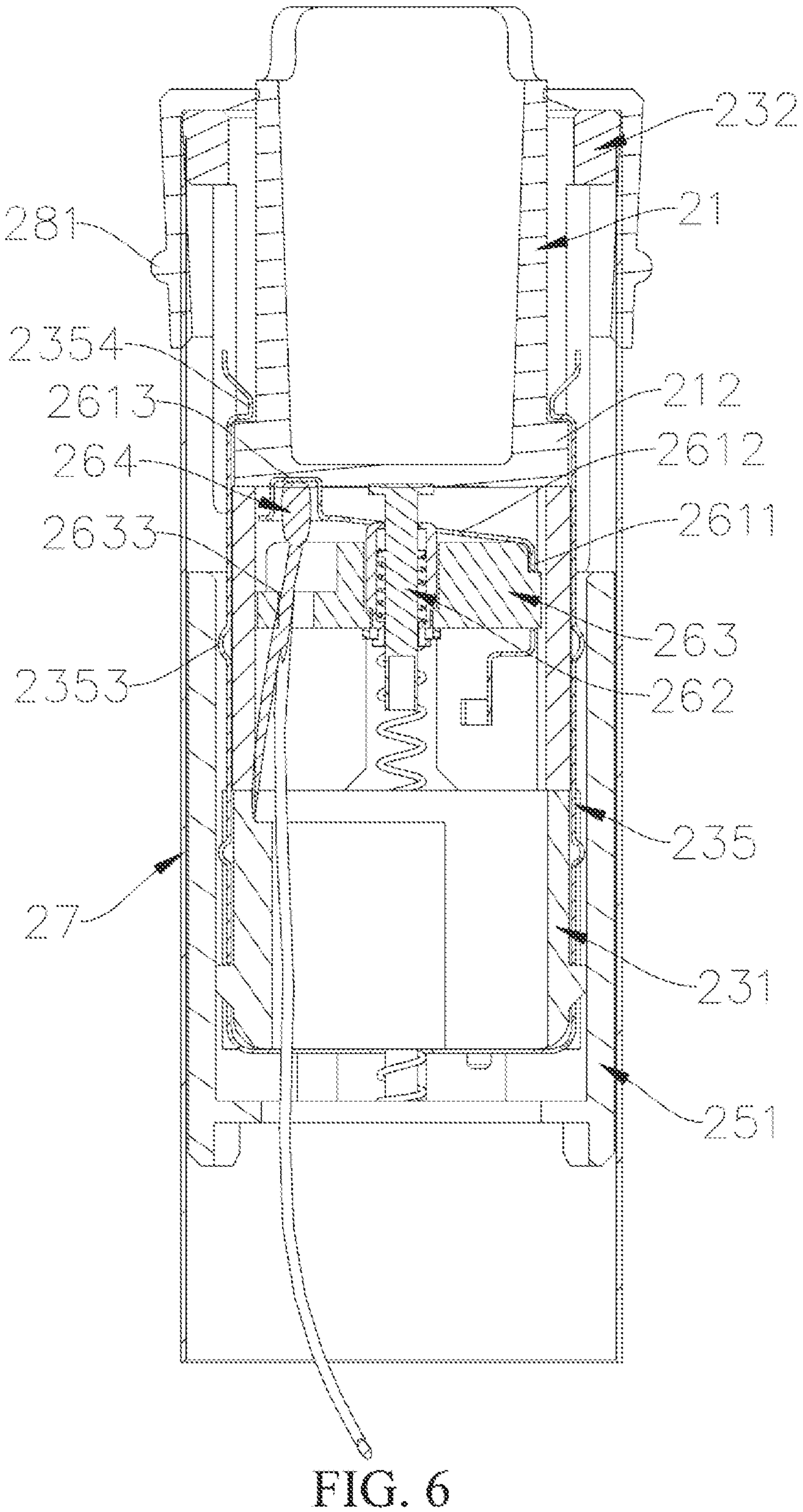
FIG. 6 is a longitudinal cross-sectional view of the heating component in FIG. 2.

As shown in FIG. 5 to FIG. 7, the heating component 20 may further include a base 263 accommodated in the limiting component 25 and a first elastic electrode 261 and a second elastic electrode 262 arranged on the base 263. The base 263 may be made of a ceramic material. In other embodiments, the base may be made of other materials such as plastic. The base 263 may include a base body 2631 accommodated in the limiting component 25 and at least one limiting portion 2632 extending outward from a side wall of the base body 2631. The at least one limiting portion 2632 is configured to limit a position of the base 263 in the limiting component 25. In this embodiment, two limiting portions 2632 are arranged. The two limiting portions 2632 are respectively arranged on two opposite sides of the base body 2631.

The first elastic electrode 261 and the second elastic electrode 262 respectively elastically abut against the first electrode portion 221 and the second electrode portion 222, and are connected to the first electrode portion 221 and the second electrode portion 222 respectively. Specifically, in some embodiments, the first elastic electrode 261 is a metal elastic sheet and may include a limiting arm 2611 configured to be engaged with and fixed to a side wall of the base 263, an elastic arm 2612 connected to an upper end of the limiting arm 2611, and an elastic contact 2613 protruding upward from an end of the elastic arm 2612 away from the limiting arm 2611. The elastic contact 2613 may be in a shape of a cylinder with an opening on a lower end, and a top wall of the elastic contact 2613 is configured to elastically contact and be connected to the first electrode portion 221. The second electrode portion 222 is an elastic electrode pole, and may extend through a middle portion of the base 263 along a longitudinal direction. A through hole 2610 for the second electrode portion 222 to pass through may be further arranged on the elastic arm 2612.

Further, the heating component 20 may further include a temperature detection element 264 configured to detect a temperature of the heating pot 21. In this embodiment, the temperature detection element 264 includes an NTC thermistor. The NTC thermistor may be embedded in the elastic contact 2613 and abut against a top wall of the elastic contact 2613. Since the elastic contact 2613 is made of a metal material and has desirable thermal conductivity, the temperature detection element 264 can quickly and accurately detect a temperature of the bottom of the heating pot 21. A wire hole 2633 for two electrode leads of the temperature detection element 264 to pass through is further arranged on base 263.

The limiting component 25 may include a first limiting tube 251 and a second limiting tube 252 axially arranged above the first limiting tube 251. The self-locking component 23 may include a support element 231, a drag hook 232, a first elastic piece 233, and an elastic engagement piece 235 mounted on the support element 231.

The support element 231 is slidably arranged in the first limiting tube 251, and may be made of a plastic material. A lower end surface of the support element 231 may be supported on and abut against an upper end surface of the sleeve portion 72 of the main unit 200. The drag hook 232 is swingably arranged on the support element 231. The drag hook may be made of the plastic material and may include a rotary shaft portion 2321, a swingable arm 2322 connected to the rotary shaft portion 2321, and a hook portion 2323 protruding outward from an outer surface of the swingable arm 2322. A rotary shaft hole 2310 is formed on a side of the support element 231, and the rotary shaft portion 2321 is swingably arranged in the rotary shaft hole 2310. The swingable arm 2322 is connected to an end of the rotary shaft portion 2321 protruding out of the rotary shaft hole 2310. The hook portion 2323 may be formed by protruding outward on an outer surface of an end of the swingable arm 2322 away from the rotary shaft portion 2321, and is configured to be engaged with the first limiting tube 251. The rotary shaft portion 2321 may be substantially in a shape of a rod having a semicircular cross-section, and includes a plane and an arcuate surface. A flange 2311 that extends downward is formed on an upper end of the rotary shaft hole 2310. The rotary shaft portion 2321 may elastically abut against the flange 2311 through the plane and may swing back and forth around the flange 2311. The first elastic piece 233 may be a spring, a lower end of the first elastic piece 233 abuts against the first limiting tube 251, and an upper end thereof abuts against the arcuate surface of the rotary shaft portion 2321, so that the rotary shaft portion 2321 elastically abuts against the flange 2311. A first cavity 2313 configured to accommodate the first elastic piece 233 is further formed on the support element 231 along a longitudinal direction.

Further, the self-locking component 23 may further include a second elastic piece 234. A lower end of the second elastic piece 234 abuts against the first limiting tube 251, and an upper end thereof abuts against the support element 231. The second elastic piece 234 may be a spring, and a second cavity 2314 configured to accommodate the second elastic piece 234 is formed on the support element 231 along a longitudinal direction. The first elastic piece 233 and the second elastic piece 234 are symmetrically distributed with respect to a central axis of the support element 231, so that a stress on the support element 231 is balanced. It may be understood that, in other embodiments, the first elastic piece 233 and the second elastic piece 234 may be other elements that can provide an elastic force, such as an elastic sheet.

Figure 9:
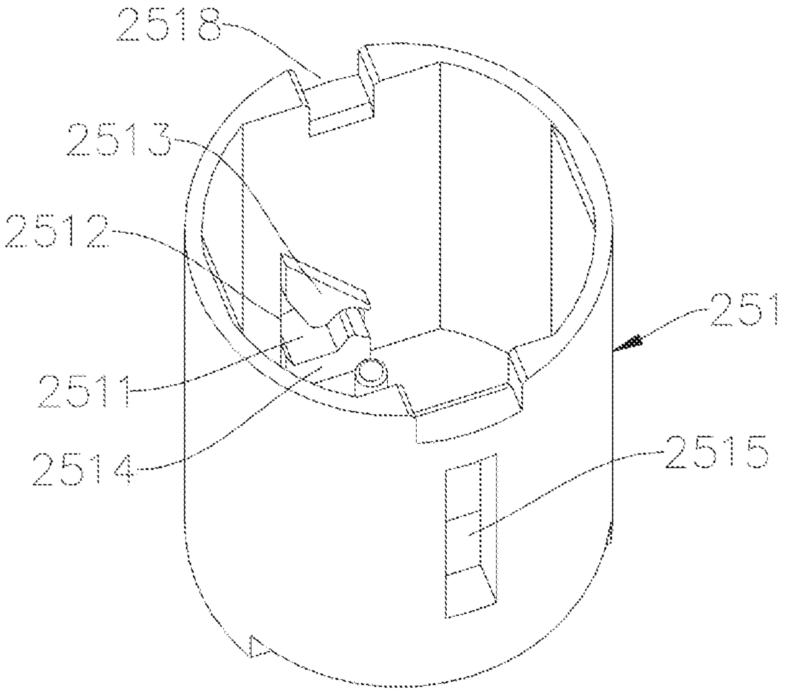
FIG. 9 is a three-dimensional schematic structural diagram of a first limiting tube of the heating component in FIG. 2.

As shown in FIG. 5, FIG. 7, and FIG. 9, the first limiting tube 251 may be cylindric, and an engagement groove 2511 configured to be engaged with the hook portion 2323 is formed on a side wall thereof of the first limiting tube. Specifically, in this embodiment, a first limiting protrusion 2513 and a second limiting protrusion 2514 that protrude inward are formed on an inner wall surface of the first limiting tube 251. The first limiting protrusion 2513 and the second limiting protrusion 2514 are spaced apart from each other in a top-to-bottom direction along an axial direction of the first limiting tube 251, and the engagement groove 2511 is formed between the first limiting protrusion 2513 and the second limiting protrusion 2514. A side of the engagement groove 2511 in a circumferential direction has an opening 2512, so that the hook portion 2323 can enter or exit the engagement groove 2511 through the opening 2512. A first guide post 2516 and a second guide post 2517 that protrude and respectively configured for the first elastic piece 233 and the second elastic piece 234 to be sleeved on may be further formed on a bottom wall of the first limiting tube 251. A sliding groove 2515 may be further arranged on a side wall of the first limiting tube 251, which is configured to guide sliding of the support element 231 and to define a maximum sliding distance of the support element 231. The sliding groove 2515 and the engagement groove 2511 may be respectively arranged on two sides of the first limiting tube 251 in a circumferential direction. Correspondingly, a slidable block 2315 that protrudes outward is formed on a side wall of the support element 231, and the slidable block 2315 is slidably arranged in the sliding groove 2515.

The second limiting tube 252 may be substantially tubular. The second limiting tube 252 is axially arranged above the first limiting tube 251, and a lower end surface of the second limiting tube may abut against an upper end surface of the first limiting tube 251. The heating pot 21 is movably accommodated in the second limiting tube 252, and the base 263 is sandwiched between the first limiting tube 251 and the second limiting tube 252. In this embodiment, a groove 2518 that is recessed downward and configured to accommodate the limiting portion 2632 is formed on a top surface of the side wall of the first limiting tube 251 corresponding to the limiting portion 2632 of the base 263. A lower end surface of the limiting portion 2632 abuts against a bottom wall of the groove 2518, and an upper end surface of the limiting portion 2632 abuts against the lower end surface of the second limiting tube 252, so that the base 263 is sandwiched and fixed between the first limiting tube 251 and the second limiting tube 252.

Figure 11:
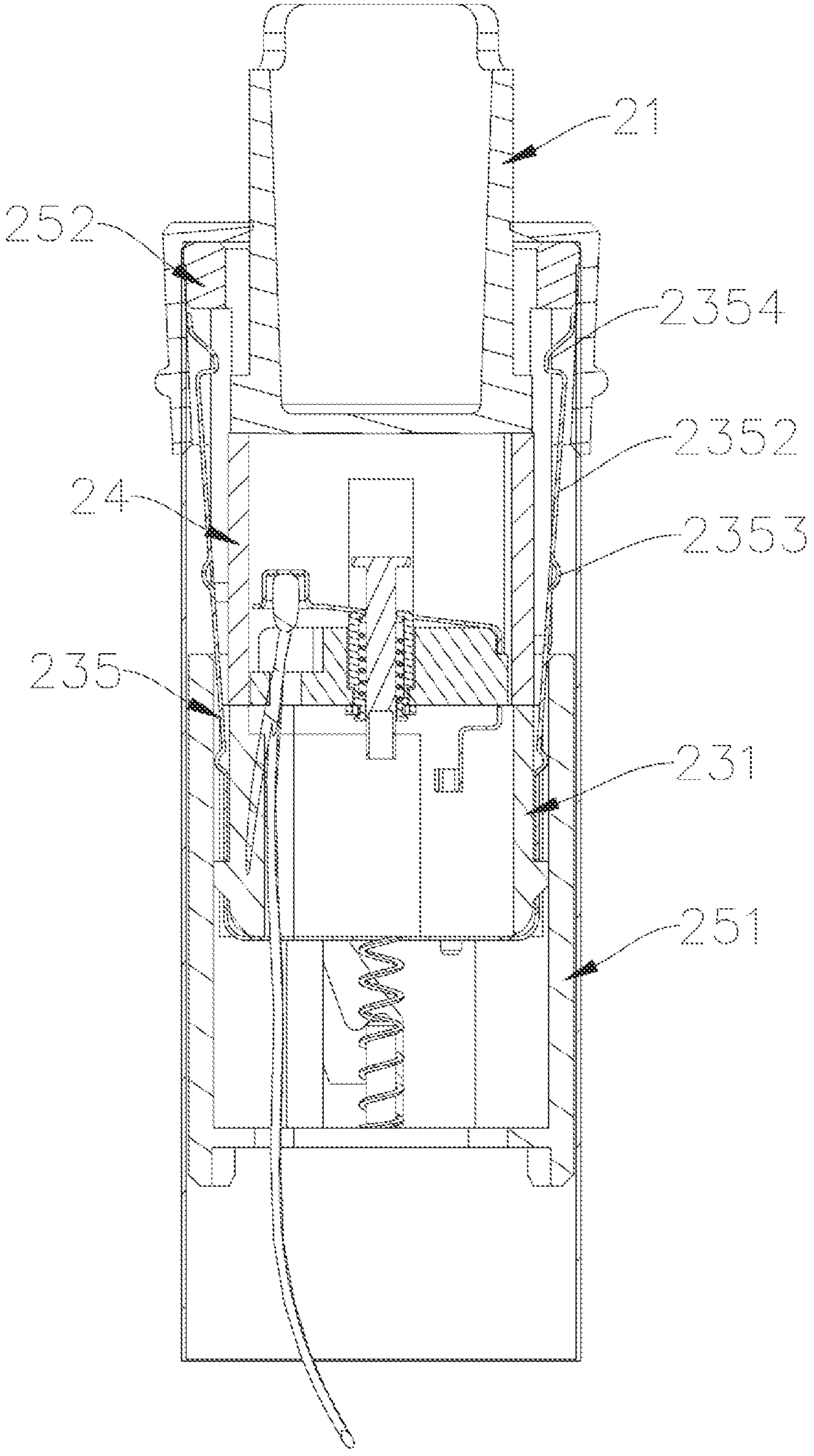
FIG. 11 is a longitudinal cross-sectional view of the heating component in FIG. 10.

As shown in FIG. 5, FIG. 6, and FIG. 11, the elastic engagement piece 235 is mounted to the support element 231 for locking or releasing the heating pot 21. The elastic engagement piece 235 may be made of a metal material and may include two elastic arms 2352 and a connection portion 2351 connected between the two elastic arms 2352. The two elastic arms 2352 are arranged symmetrically to each other. When the elastic engagement piece 235 is in an original state and the elastic arms 2352 are not subjected to an external force, the two elastic arms 2352 are in an open state. When subjected to an external force, the two elastic arms 2352 are deformed inward, thereby locking the heating pot 21.

Specifically, the connection portion 2351 is in a shape of a sheet and may be mounted to a bottom wall of the support element 231. The connection portion may be engaged with and fixed to the bottom wall of the support element 231 through engagement structures. A lower end of each of the elastic arms 2352 is connected to the connection portion 2351, and a locking portion 2354 that is bent inward and configured to lock the heating pot 21 is formed on an upper end of the elastic arm 2352. Two open grooves 2521 are respectively arranged on a side wall of the second limiting tube 252 corresponding to the two elastic arms 2352 to expose the heating pot 21, so that the two elastic arms 2352 can respectively pass through the two open grooves 2521 and securely hold the heating pot 21. A positioning hole 2355 configured to be engaged with the side wall of the support element 231 may be further formed on the elastic arm 2352, and the positioning hole 2355 may be arranged close to the connection portion 2351. An abutment portion 2353 that extends outward may be further formed on an outer surface of the elastic arm 2352 (a side surface facing away from the connection portion 2351). The inner wall surface of the first limiting tube 251 is operably pressed against the abutment portion 2353, thereby deforming the elastic arm 2352 inward to lock the heating pot 21.

Further, the heating component 20 may further include a connector 24 movably accommodated in the limiting component 25. The connector 24 is tubular and is arranged between the heating pot 21 and the support element 231. An upper end surface of the connector 24 abuts against a lower end surface of the heating pot 21, and a lower end surface of the connector 24 abuts against an upper end surface of the support element 231. In some embodiments, the connector 24 may be further engaged with the support element 231 through engagement structures that mate with each other. Specifically, in this embodiment, two engagement arms 2316 that extend upward are respectively formed on two sides of a top wall of the support element 231. An engagement hole 2317 is arranged on each of the engagement arms 2316. Engagement plugs 2315 that protrude are respectively formed on two side walls of the connector 24 corresponding to the engagement holes 2317. The engagement hole 2317 is engaged with the engagement plug 2315, so as to engage the connector 24 with the support element 231. A guide groove 241 is formed on a side wall of the connector 24 corresponding to the limiting portion 2632 of the base 263. The limiting portion 2632 is slidably arranged in the guide groove 241 and guides sliding of the connector 24.

Further, the heating component 20 may further include an outer tube 27 and a seal sleeve 28. The outer tube 27 is tubular and is sleeved outside the limiting component 25. The outer tube may be made of a metal material. In other embodiments, the outer tube may be made of other materials such as plastic. A lower end of the outer tube 27 may be sleeved on the sleeve portion 72 of the main unit 200, and a lower end surface thereof may abut against an upper end surface of the holder 70. The seal sleeve 28 is sleeved outside an upper end of the outer tube 27, and may be made of an elastic material such as silica gel. An annular flange 281 that extends outward along a radial direction may be formed on an outer wall surface of the seal sleeve 28. The annular flange 281 abuts against a cavity wall of the accommodating cavity 1130 and is hermetically engaged with the cavity wall of the accommodating cavity 1130, so that air leakage can be prevented.

As shown in FIG. 3, FIG. 6, and FIG. 7, the heating pot 21 is at the first position. At this time, the first electrode portion 221 and the second electrode portion 222 on the bottom of the heating pot 21 respectively elastically abut against the first elastic electrode 261 and the second elastic electrode 262, so as to contact and be connected to the first elastic electrode 261 and the second elastic electrode 262. The hook portion 2323 of the drag hook 232 is engaged with the engagement groove 2511 and elastically pressed against the first limiting protrusion 2513 under an action of the first elastic piece 233. The abutment portion 2353 on the elastic engagement piece 235 is pressed by the first limiting tube 251, so that the elastic arm 2352 is deformed inward to lock the heating pot 21, and a lower end surface of the locking portion 2354 of the elastic engagement piece 235 may abut against an upper end surface of the pot bottom 212 of the heating pot 21.

When the heating pot 21 is required to be taken out, the seal plug 30 is pulled out, to expose the first opening 1152 on the nozzle integrated condensation cap 10, and then the heating pot 21 is pressed down by a set distance (for example, 0.5-2 mm). The heating pot 21 moves downward under the pressure, and pushes the support element 231 downward through the connector 24, and thereby drives the drag hook 232 to swing by a set angle, so that the hook portion 2323 exits the engagement groove 2511, thereby releasing the self-locking component 23. Then, under the elastic forces of the first elastic piece 233 and the second elastic piece 234, the support element 231, the drag hook 232, and the elastic engagement piece 235 move upward, and push the connector 24 and the heating pot 21 upward.

Figure 10:
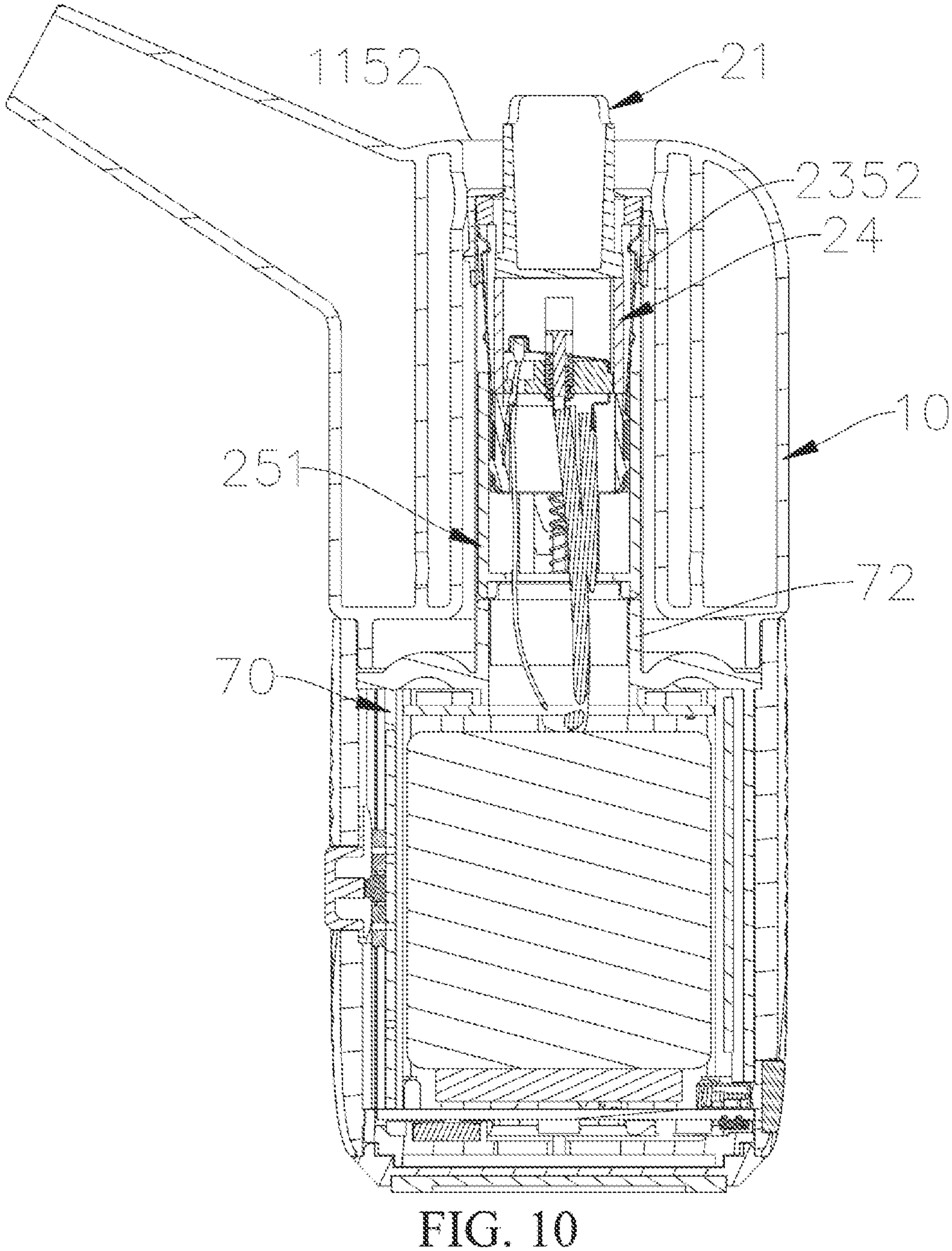
FIG. 10 is a longitudinal cross-sectional view of the heating pot of the electronic vaporization device in FIG. 3 moved to a second position.
Figure 12:
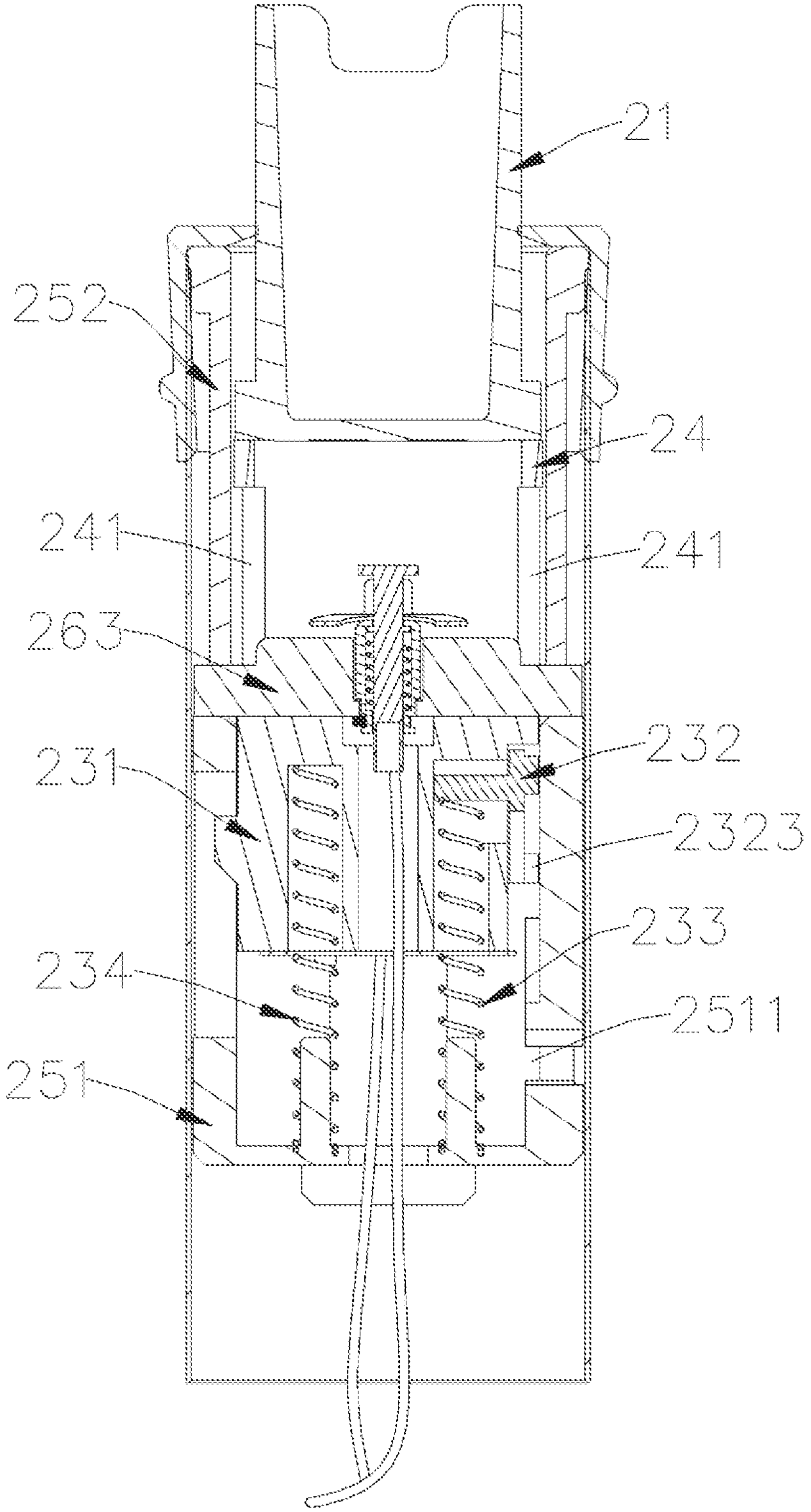
FIG. 12 is a longitudinal cross-sectional view of the heating component in FIG. 10 from another angle.

As shown in FIG. 10 to FIG. 12, when the heating pot 21 moves upward to the second position, an upper end of the heating pot 21 moves upward to outside of the first opening 1152. The abutment portion 2353 on the elastic engagement piece 235 moves upward and is disengaged from the first limiting tube 251, so that the elastic arm 2352 is released from the restraint and opens outward, thereby releasing the heating pot 21. At this time, the heating pot 21 can be conveniently taken out from the vaporizer 100.

When a cleaned heating pot 21 or a new heating pot 21 is required to be assembled, the heating pot 21 is placed through the first opening 1152 of the nozzle integrated condensation cap 10, and then the heating pot 21 is pressed downward again. The heating pot 21 moves downward under the pressure, and then pushes the support element 231 and the drag hook 232 downward through the connector 24. When the drag hook 232 moves downward to the engagement groove 2511, the drag hook can swing by a set angle under a joint action of the support element 231 and the first elastic piece 233, so that the hook portion 2323 is engaged with the engagement groove 2511 again, thereby locking the self-locking component 23. At the same time, the elastic arm 2352 of the elastic engagement piece 235 locks the heating pot 21 under constraint of the first limiting tube 251, thereby preventing the heating pot 21 from shaking.

It can be understood that the foregoing technical features can be used in any combination without limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A heating component, comprising:

a heating pot;

a self-locking component comprising a support element, a drag hook swingably arranged on the support element, and a first elastic piece having an upper end and a lower end; and a limiting component comprising a first limiting tube, wherein the lower end of the first elastic piece abuts against the first limiting tube, wherein the upper end of the first elastic piece abuts against a surface of the drag hook, wherein the first limiting tube comprises an engagement groove formed on a side wall of the first limiting tube, wherein the self-locking component is slidably accommodated in the first limiting tube of the limiting component and has a locked state, in which the self-locking component is engaged with the limiting component, and an unlocked state, in which the self-locking component is disengaged from the limiting component, wherein the heating pot is movably accommodated in the limiting component and movable along a longitudinal direction between a first position, in which the self-locking component is switchable from the locked state to the unlocked state, and a second position, wherein the heating pot is pressable against the self-locking component and when the heating pot is pressed at the second position:

the drag hook of the self-locking component moves downward along the longitudinal direction to the engagement groove, and the drag hook swings under a joint action of the support element and the first elastic piece such that a hook portion of the drag hook engages with the engagement groove, wherein the self-locking component is configured to push the heating pot along the longitudinal direction to the second position upon switching the self-locking component from the locked state to the unlocked state.

2. The heating component of claim 1, wherein the hook portion is configured to be engaged with or disengaged from the engagement groove to lock or unlock the self-locking component.

3. The heating component of claim 1, wherein the support element is slidably accommodated in the first limiting tube, wherein a rotary shaft hole is formed on the support element, wherein the drag hook comprises a rotary shaft portion swingably arranged in the rotary shaft hole of the support element and a swingable arm connected to the rotary shaft portion, and wherein the hook portion is formed on the drag hook and protrude from the swingable arm of the drag hook.

4. The heating component of claim 1, wherein a first limiting protrusion and a second limiting protrusion that protrude inward are formed on an inner wall surface of the first limiting tube, and wherein the engagement groove is formed between the first limiting protrusion and the second limiting protrusion.

5. The heating component of claim 1, wherein a sliding groove is arranged on the side wall of the first limiting tube, wherein a slidable block that protrudes outward is formed on a side wall of the support element, and wherein the slidable block is slidably arranged in the sliding groove.

6. The heating component of claim 1, wherein the self-locking component comprises a second elastic piece, and wherein two ends of the second elastic piece are respectively connected to the support element and the first limiting tube.

7. The heating component of claim 6, wherein the first elastic piece and the second elastic piece are distributed symmetrically with respect to a central axis of the support element.

8. The heating component of claim 1, wherein the self-locking component comprises an elastic engagement piece, wherein the elastic engagement piece comprises two elastic arms and a connection portion connected between the two elastic arms, wherein the connection portion of the elastic engagement piece is mounted to a bottom wall of the support element, and wherein an upper end of each of the two elastic arms comprises a locking portion that is bent inward to lock the heating pot at the first position and release the heating pot at the second position.

9. The heating component of claim 8, wherein, at the first position, the two elastic arms are deformed inward under constraint of the first limiting tube, so as to lock the heating pot, and at the second position, the two elastic arms are released from the constraint and open outward, so as to release the heating pot.

10. The heating component of claim 1, further comprising:

a first electrode portion and a second electrode portion arranged on a bottom surface of the heating pot, wherein the second electrode portion is arranged at a middle portion of the bottom surface of the heating pot, and wherein the first electrode portion is annular and surrounds the second electrode portion.

11. The heating component of claim 10, further comprising:

a first elastic electrode and a second elastic electrode accommodated in the limiting component, wherein the first elastic electrode and the second elastic electrode are respectively configured to contact and be connected to the first electrode portion and the second electrode portion.

12. The heating component of claim 11, wherein the first elastic electrode comprises a metal elastic sheet and an elastic contact configured to elastically contact and be connected to the first electrode portion.

13. The heating component of claim 12, further comprising:

a temperature detection element, wherein the elastic contact is cylindrical, and wherein the temperature detection element is embedded in the elastic contact.

14. The heating component of claim 11, further comprising:

a base accommodated in the limiting component, wherein the first elastic electrode and the second elastic electrode are both mounted to the base, wherein the limiting component further comprises a second limiting tube, and wherein the base is sandwiched between the first limiting tube and the second limiting tube.

15. The heating component of claim 3, further comprising:

a connector movably accommodated in the limiting component and arranged between the heating pot and the support element, wherein an upper end surface of the connector abuts against the heating pot, and wherein the connector is engaged with the support element.

16. The heating component of claim 1, further comprising:

an outer tube configured to accommodate the limiting component.

17. A vaporizer, comprising:

the heating component of claim 1, wherein an end of the vaporizer has a first opening, and wherein at least part of the heating pot protrudes out of the first opening when the heating pot is at the second position.

18. An electronic vaporization device, comprising:

the vaporizer of claim 17.

* * * * *